(12) United States Patent
Wu et al.

(10) Patent No.: US 9,602,238 B2
(45) Date of Patent: Mar. 21, 2017

(54) DECODING METHOD AND APPARATUS

(71) Applicant: Huawei Technologies Co., Ltd., Shenzhen (CN)

(72) Inventors: Zhanji Wu, Beijing (CN); Zhiyu Xiao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/799,381

(22) Filed: Jul. 14, 2015

(65) Prior Publication Data
US 2015/0318955 A1    Nov. 5, 2015

Related U.S. Application Data

(63) Continuation of application No. PCT/CN2013/070414, filed on Jan. 14, 2013.

(51) Int. Cl.
*H04L 1/00* (2006.01)
*H04L 27/10* (2006.01)
(Continued)

(52) U.S. Cl.
CPC ............ *H04L 1/0048* (2013.01); *H04L 1/005* (2013.01); *H04L 1/0054* (2013.01);
(Continued)

(58) Field of Classification Search
CPC .. H03M 13/00; H03M 13/03; H03M 13/2939; H03M 13/258; H04L 1/0618; H04L 1/004; H04L 1/0036
See application file for complete search history.

(56) References Cited

U.S. PATENT DOCUMENTS

| | | | |
|---|---|---|---|
| 6,968,021 B1* | 11/2005 | White | H04L 1/005 375/265 |
| 2004/0022179 A1* | 2/2004 | Giannakis | H03M 13/29 370/207 |

(Continued)

FOREIGN PATENT DOCUMENTS

| | | |
|---|---|---|
| CN | 101026430 | 8/2007 |
| CN | 100481827 | 4/2009 |

(Continued)

OTHER PUBLICATIONS

Hoeher, Peter, et al., "Turbo DPSK: Iterative Differential PSK Demodulation and Channel Decoding," IEEE Transactions on Communications, vol. 47, No. 6, Jun. 1, 1999, pp. 837-843.

(Continued)

*Primary Examiner* — Jean B Corrielus
(74) *Attorney, Agent, or Firm* — Slater Matsil, LLP

(57) ABSTRACT

Embodiments of the present invention provide a decoding method and apparatus. The method includes: acquiring a demodulation signal; acquiring a first decoding signal, where the first decoding signal is a signal fed back after the $i^{th}$ M-ary differential decoding processing is performed on the demodulation signal, and i is an integer greater than or equal to 0; and performing M-ary differential decoding processing on the demodulation signal according to the first decoding signal, to obtain a second decoding signal. The first decoding signal that is fed back is added and input to a decoder.

14 Claims, 8 Drawing Sheets

(51) Int. Cl.
H04L 27/233 (2006.01)
H04L 27/38 (2006.01)
(52) U.S. Cl.
CPC .......... *H04L 1/0055* (2013.01); *H04L 27/106* (2013.01); *H04L 27/233* (2013.01); *H04L 27/3845* (2013.01); *H04L 1/0058* (2013.01)

(56) References Cited

U.S. PATENT DOCUMENTS

| | | | | |
|---|---|---|---|---|
| 2006/0129902 | A1* | 6/2006 | Lee | H04L 1/005 714/794 |
| 2007/0038922 | A1* | 2/2007 | Kim | H03M 13/2975 714/776 |
| 2010/0199153 | A1 | 8/2010 | Okamura et al. | |
| 2010/0254446 | A1* | 10/2010 | Khayrallah | H04B 7/005 375/232 |
| 2011/0116515 | A1* | 5/2011 | Van Houtum | H03M 7/3002 370/479 |
| 2014/0064412 | A1* | 3/2014 | Lin | H04L 25/03171 375/330 |

FOREIGN PATENT DOCUMENTS

| | | |
|---|---|---|
| CN | 101808057 | 8/2010 |
| CN | 101841339 A | 9/2010 |
| EP | 1059748 | 12/2000 |

OTHER PUBLICATIONS

Bisplinghoff, A. et al., "Soft Decision Metrics for Differentially Encoded QPSK," 37th European Conference on Exhibition on Optical Communication (ECOC). Technical Digest, Sep. 18-22, 2011, 3 pp.

Kuschnerov, M. et al., "Low Complexity Soft Differential Decoding of QPSK for Forward Error Correction in Coherent Optic Receivers," 36th European Conference and Exhibition on Optical Communication (ECOC) 2010, Sep. 19-23, 2010, Torino, Italy, 3 pp.

Pusane, Ali Emre et al., "On Deriving Good LDPC Convolutional Codes from QC LDPC Block Codes," IEEE International Symposium on Information Theory, ISIT 2007, Nice, France, Jun. 24-29, 2007, 5 pp.

* cited by examiner

DECODING METHOD AND APPARATUS

This application is a continuation of International Patent Application No. PCT/CN2013/070414, filed on Jan. 14, 2013, which is hereby incorporated by reference in its entirety.

TECHNICAL FIELD

Embodiments of the present invention relate to communications technologies, and in particular, to a decoding method and apparatus.

BACKGROUND

In recent years, optical communications is rapidly developed by virtue of having widely available frequency bands and advantages of being light weight and being free of electromagnetic interference.

In a high-speed optical transmission system, a multi-system modulation technology is frequently used with forward error correction coding at a transmitter end to improve transmission efficiency of the system and lower bit error rate of the system. However, when coherent demodulation is performed on a signal at a receiver end, a carrier recovered by the receiver end may have a same frequency and phase as a carrier of a received signal, or may have a same frequency as and a reverse phase to a carrier of the received signal. When the carrier recovered by the receiver end has the same frequency as and the reverse phase to the carrier of the received signal, a data stream polarity after demodulation is reverse to a data stream sending polarity, which severely affects system performance.

In the prior art, the transmitter end prevents, by using a differential coding method, the data stream polarity obtained after the receiver end performs demodulation from being reverse to the data stream sending polarity, that is, the transmitter end transmits information by using a phase difference between adjacent symbols, and the receiver end performs decoding by using a differential decoding method.

However, in the prior art, bit error spread may be caused in a differential decoding process, leading to a relative increase of an input bit error rate of a forward error correction module of the receiver end.

SUMMARY

Embodiments of the present invention provide a decoding method and apparatus, so as to lower a bit error rate generated in a decoding process.

According to a first aspect, a decoding method includes acquiring a demodulation signal; acquiring a first decoding signal, where the first decoding signal is a signal fed back after the $i^{th}$ M-ary differential decoding processing is performed on the demodulation signal, and i is an integer greater than or equal to 0; and performing M-ary differential decoding processing on the demodulation signal according to the first decoding signal, to obtain a second decoding signal.

With reference to the first aspect, in a first possible implementation manner, the performing M-ary differential decoding processing on the demodulation signal according to the first decoding signal includes performing, by using a Bahl-Cocke-Jelinek-Raviv (BCJR) algorithm, M-ary differential decoding processing on the demodulation signal according to a state transition diagram of differential quadrature phase shift keying (DQPSK) differential coding or hexadecimal quadrature amplitude modulation (D16QAM) differential coding corresponding to the demodulation signal; and obtaining the second decoding signal according to the relation $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using the BCJR algorithm, $E_i'(c_k)$ is the first decoding signal, and $E_i(c_k)$ is the second decoding signal.

With reference to the first aspect or the first possible implementation manner, in a second possible implementation manner, after the performing M-ary differential decoding processing on the demodulation signal according to the first decoding signal, the method further includes performing forward error correction FEC decoding processing on the second decoding signal obtained after M-ary differential decoding processing is performed.

With reference to the second possible implementation manner, in a third possible implementation manner, the performing forward error correction (FEC) decoding processing on the second decoding signal obtained after M-ary differential decoding processing is performed includes optimizing a degree distribution of a low-density parity-check (LDPC) code used for FEC coding corresponding to the second decoding signal, to acquire an optimal degree distribution of the LDPC code; constructing, according to the optimal degree distribution, an LDPC code check matrix meeting the optimal degree distribution; and performing, according to the LDPC code check matrix, FEC decoding processing on the second decoding signal obtained after M-ary differential decoding processing is performed.

With reference to the third possible implementation manner, in a fourth possible implementation manner, the optimizing a degree distribution of a low-density parity-check (LDPC) code used for FEC coding corresponding to the second decoding signal, to acquire an optimal degree distribution of the LDPC code includes determining an initial degree distribution at a set bit rate based on which the FEC decoding processing is performed; determining an initial signal-to-noise ratio corresponding to the initial degree distribution; successively determining multiple first degree distributions corresponding to the set bit rate, and if two curves in an extrinsic information transition diagram of the first degree distributions corresponding to the set bit rate at the initial signal-to-noise ratio do not intersect, updating the initial signal-to-noise ratio with a first signal-to-noise ratio corresponding to the first degree distribution, until a quantity of the determined first degree distributions meets a set value; and using the first degree distributions that are corresponding to the first signal-to-noise ratio and whose quantity meets the set value as the optimal degree distribution of the LDPC code.

With reference to the second possible implementation manner, in a fifth possible implementation manner, before the performing forward error correction FEC decoding processing on the second decoding signal obtained after M-ary differential decoding processing is performed, the method further includes performing reverse interleaving processing on the second decoding signal obtained after M-ary differential decoding processing is performed, to obtain a reversely-interleaved second decoding signal; the performing forward error correction (FEC) decoding processing on the second decoding signal obtained after M-ary differential decoding processing is performed includes: performing FEC decoding processing on the reversely-interleaved second decoding signal; and before the performing M-ary differential decoding processing on the demodulation signal according to the first decoding signal, to obtain a second decoding signal, the method further includes performing forward interleaving processing on the first decoding signal.

According to a second aspect, a decoding apparatus includes an acquiring module, configured to acquire a demodulation signal; a decoding module, configured to acquire a first decoding signal, where the first decoding signal is a signal fed back after the $i^{th}$ M-ary differential decoding processing is performed on the demodulation signal, and i is an integer greater than or equal to 0, where the decoding module is further configured to perform M-ary differential decoding processing on the demodulation signal according to the first decoding signal, to obtain a second decoding signal.

With reference to the second aspect, in a first possible implementation manner, the decoding module is specifically configured to perform, by using a Bahl-Cocke-Jelinek-Raviv (BCJR) algorithm, M-ary differential decoding processing on the demodulation signal according to a state transition diagram of differential quadrature phase shift keying (DQPSK) differential coding or hexadecimal quadrature amplitude modulation (D16QAM) differential coding corresponding to the demodulation signal; and obtain the second decoding signal according to the relation $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using the BCJR algorithm, $E_i(c_k)$ is the first decoding signal, and $E_i(c_k)$ is the second decoding signal.

With reference to the second aspect or the first possible implementation manner, in a second possible implementation manner, the apparatus further includes: an FEC decoding module, configured to perform forward error correction FEC decoding processing on the second decoding signal obtained after M-ary differential decoding processing is performed.

With reference to the second possible implementation manner, in a third possible implementation manner, the FEC decoding module is specifically configured to optimize a degree distribution of a low-density parity-check (LDPC) code used for FEC coding corresponding to the second decoding signal, to acquire an optimal degree distribution of the LDPC code; construct, according to the optimal degree distribution, an LDPC code check matrix meeting the optimal degree distribution; and perform, according to the LDPC code check matrix, FEC decoding processing on the second decoding signal obtained after M-ary differential decoding processing is performed.

With reference to the third possible implementation manner, in a fourth possible implementation manner, the FEC decoding module is specifically configured to determine an initial degree distribution at a set bit rate based on which the FEC decoding processing is performed; determine an initial signal-to-noise ratio corresponding to the initial degree distribution; and successively determine multiple first degree distributions corresponding to the set bit rate, and if two curves in an extrinsic information transition diagram of the first degree distributions corresponding to the set bit rate at the initial signal-to-noise ratio do not intersect, update the initial signal-to-noise ratio with a first signal-to-noise ratio corresponding to the first degree distribution, until a quantity of the determined first degree distributions meets a set value; and use the first degree distributions that are corresponding to the first signal-to-noise ratio and whose quantity meets the set value as the optimal degree distribution of the LDPC code.

With reference to the second possible implementation manner, in a fifth possible implementation manner, the apparatus further includes a reverse interleaving module, configured to perform reverse interleaving processing on the second decoding signal obtained after M-ary differential decoding processing is performed, to obtain a reversely-interleaved second decoding signal, where the FEC decoding module is specifically configured to perform FEC decoding processing on the reversely-interleaved second decoding signal; and a forward interleaving module, configured to perform forward interleaving processing on the first decoding signal.

According to a third aspect, a decoding apparatus includes an acquirer, configured to acquire a demodulation signal; and a decoder, configured to acquire a first decoding signal, where the first decoding signal is a signal fed back after the $i^{th}$ M-ary differential decoding processing is performed on the demodulation signal, and i is an integer greater than or equal to 0, where the decoder is further configured to perform M-ary differential decoding processing on the demodulation signal according to the first decoding signal, to obtain a second decoding signal.

With reference to the third aspect, in a first possible implementation manner, the decoder is specifically configured to perform, by using a Bahl-Cocke-Jelinek-Raviv (BCJR) algorithm, M-ary differential decoding processing on the demodulation signal according to a state transition diagram of differential quadrature phase shift keying (DQPSK) differential coding or hexadecimal quadrature amplitude modulation (D16QAM) differential coding corresponding to the demodulation signal; and obtain the second decoding signal according to the relation $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the) demodulation signal by using the BCJR algorithm, $E_i'(c_k)$ is the first decoding signal, and $E_i(c_k)$ is the second decoding signal.

With reference to the third aspect or the first possible implementation manner, in a second possible implementation manner, the apparatus further includes an FEC decoder, configured to perform forward error correction FEC decoding processing on the second decoding signal obtained after M-ary differential decoding processing is performed.

With reference to the second possible implementation manner, in a third possible implementation manner, the FEC decoder is specifically configured to optimize a degree distribution of a low-density parity-check (LDPC) code used for FEC coding corresponding to the second decoding signal, to acquire an optimal degree distribution of the LDPC code; construct, according to the optimal degree distribution, an LDPC code check matrix meeting the optimal degree distribution; and perform, according to the LDPC code check matrix, FEC decoding processing on the second decoding signal obtained after M-ary differential decoding processing is performed.

With reference to the third possible implementation manner, in a fourth possible implementation manner, the FEC decoder is specifically configured to determine an initial degree distribution at a set bit rate based on which the FEC decoding processing is performed; determine an initial signal-to-noise ratio corresponding to the initial degree distribution; and successively determine multiple first degree distributions corresponding to the set bit rate, and if two curves in an extrinsic information transition diagram of the first degree distributions corresponding to the set bit rate at the initial signal-to-noise ratio do not intersect, update the initial signal-to-noise ratio with a first signal-to-noise ratio corresponding to the first degree distribution, until a quantity of the determined first degree distributions meets a set value; and use the first degree distributions that are corresponding to the first signal-to-noise ratio and whose quantity meets the set value as the optimal degree distribution of the LDPC code.

With reference to the second possible implementation manner, in a fifth possible implementation manner, the apparatus further includes a reverse interleaver, configured to perform reverse interleaving processing on the second decoding signal obtained after M-ary differential decoding processing is performed, to obtain a reversely-interleaved second decoding signal, where the FEC decoder is specifically configured to perform FEC decoding processing on the reversely-interleaved second decoding signal; and a forward interleaver, configured to perform forward interleaving processing on the first decoding signal.

According to the decoding method and apparatus provided by the embodiments of the present invention, a demodulation signal is acquired; a first decoding signal is acquired, where the first decoding signal is a signal fed back after the $i^{th}$ M-ary differential decoding processing is performed on the demodulation signal, and i is an integer greater than or equal to 0; and M-ary differential decoding processing is performed on the demodulation signal according to the first decoding signal, to obtain a second decoding signal. Because a decoder adds a decoding processing result as a feedback signal, bit error spread generated in a decoding process is reduced, a bit error rate of a system is lowered, and accuracy of signal transmission is improved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
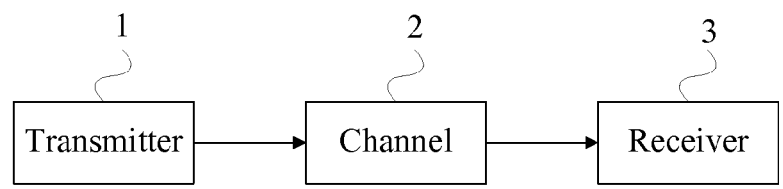
FIG. 1 is a basic schematic structural diagram of a fiber optic communications system.

FIG. 1 is a basic schematic structural diagram of a fiber optic communications system. As shown in FIG. 1, the system may include a transmitter 1, a channel 2, and a receiver 3, where the transmitter 1 may process an input signal, so as to make the signal suitable for being transmitted on the channel 2; the channel 2 may transmit the signal; and the receiver 3 may receive the signal transmitted from the channel and process the received signal, so as to ensure accuracy of the received signal.

Figure 5:
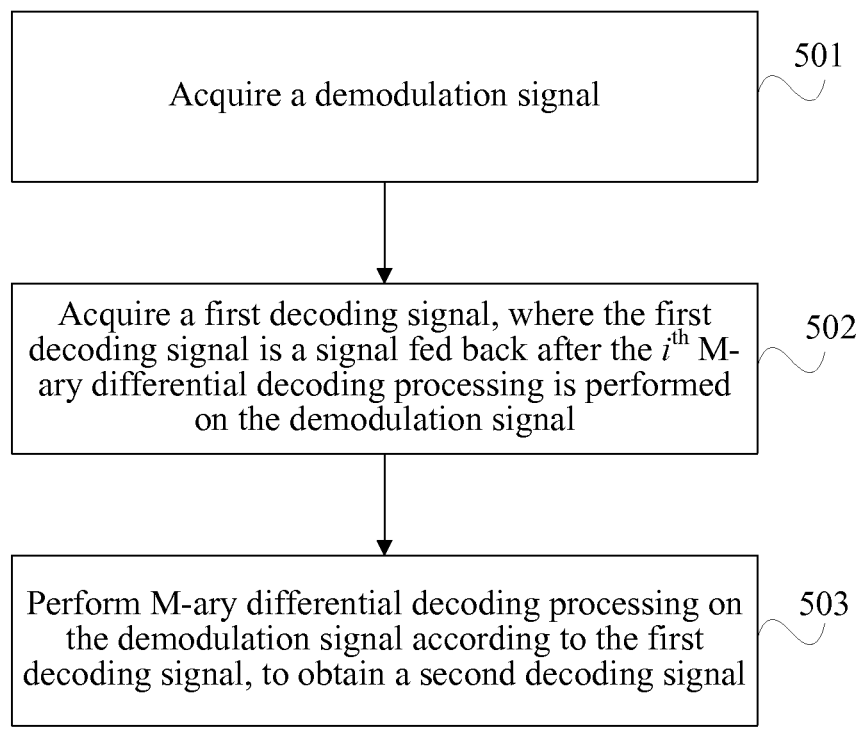
FIG. 5 is a schematic flowchart of Embodiment 1 of a decoding method according to the present invention.

Embodiments of a decoding method of the present invention are applicable to the fiber optic system shown in FIG. 1 and various fiber optic systems extended based on FIG. 1. FIG. 5 is a schematic flowchart of Embodiment 1 of a decoding method according to the present invention. As shown in FIG. 5, the following steps are performed by a receiver 3, and the method in this embodiment includes the following steps.

S501: Acquire a demodulation signal.

The receiver may demodulate a received signal by using a demodulation scheme corresponding to a transmitter, to obtain a demodulation signal. In the following description, $L(d_k)$ is used for indicating the demodulation signal acquired after demodulation, where $d_k$ indicates a differential coding output bit at a moment k.

S502: Acquire a first decoding signal, where the first decoding signal is a signal fed back after the $i^{th}$ M-ary differential decoding processing is performed on the demodulation signal.

The first decoding signal may be indicated by using $E_i'(c_k)$, where $c_k$ indicates a differential coding input bit at the moment k, i is an integer greater than or equal to 0, generally, i takes an positive integer less than or equal to N, N is a preset number of iterations, and $E_i'(c_k)$ is a first decoding signal fed back after M-ary decoding processing is performed on the demodulation signal. It may be understood that, if a current decoding operation is an initial decoding operation, the acquired first decoding signal $E_i'(c_k)$ is 0, that is, before the receiver performs decoding processing on the demodulation signal, an initial value of the first decoding signal $E_i'(c_k)$ acquired by the receiver is 0. If the current decoding operation is a non-initial decoding operation, the acquired first decoding signal is a signal fed back after a previous decoding operation of the current decoding operation, that is, after the receiver performs decoding processing on the demodulation signal, the receiver may use a result obtained by performing decoding processing previously, that is, the first decoding signal, as an input signal for performing current decoding processing.

Decoding processing in S502 may be decoding processing that is corresponding to coding processing performed by the transmitter and that is performed by the receiver on the demodulation signal.

For example, in an implementation scenario, if the transmitter only performs M-ary differential coding processing on a to-be-sent signal, correspondingly, decoding processing performed by the receiver on the demodulation signal is M-ary differential decoding processing, and the first decoding signal is a signal obtained by performing M-ary differential decoding processing. In another implementation scenario, if the transmitter first performs FEC coding processing on a to-be-sent signal, and then performs M-ary differential coding processing on the to-be-sent signal, correspondingly, the receiver first performs M-ary differential decoding processing on the demodulation signal, and then performs FEC decoding processing on the demodulation signal, and the first decoding signal is a signal obtained by performing FEC decoding processing. In still another implementation scenario, if the transmitter first performs FEC coding processing on a to-be-sent signal, performs forward interleaving processing on the to-be-sent signal, and then performs M-ary differential coding processing on the to-be-sent signal, correspondingly, the receiver first performs M-ary differential decoding processing on the demodulation signal, performs reverse interleaving processing on the demodulation signal, performs FEC decoding processing on the demodulation signal, and then performs forward interleaving processing on a signal after FEC decoding processing, and the first decoding signal is a signal obtained by performing forward interleaving processing.

To sum up, the first decoding signal fed back after decoding processing is performed depends on decoding processing corresponding to the transmitter and performed by the receiver. In addition to the various implementation scenarios described above, this embodiment of the present invention is further applicable to existing various implementation scenarios of coding processing of the transmitter and decoding processing corresponding to the receiver, and details are not provided herein again.

S503: Perform M-ary differential decoding processing on the demodulation signal according to the first decoding signal, to obtain a second decoding signal.

The receiver may perform a decoding operation by using the demodulation signal $L(d_k)$ and the first decoding signal $E_i'(c_k)$ that are acquired in S501 and S502 as input signals, to obtain the second decoding signal. The second decoding signal may be indicated by using $E_i(c_k)$, where i takes a positive integer less than or equal to N, and N is a preset number of iterations. It can be seen that, a decoding processing process performed by the receiver actually may be understood as a process of performing iteration by using a previous decoding processing result and a currently input demodulation signal. For the first time, the first decoding signal $E_1'(c_k)$ is 0, decoding processing is performed on $L(d_k)$ according to the signal $E_1'(c_k)$ that is input for the first time, and a signal $E_1(c_k)$ is output, which is a first iterative decoding process. For the second time, signals $E_2'(c_k)$ and $L(d_k)$ are input, and a signal $E_2(c_k)$ is output, which is a second iterative decoding process. By analogy, a signal, that is, a second decoding signal $E_N(c_k)$, is output until i is equal to N, where N is greater than or equal to 2, and iteration is stopped.

Figure 2:
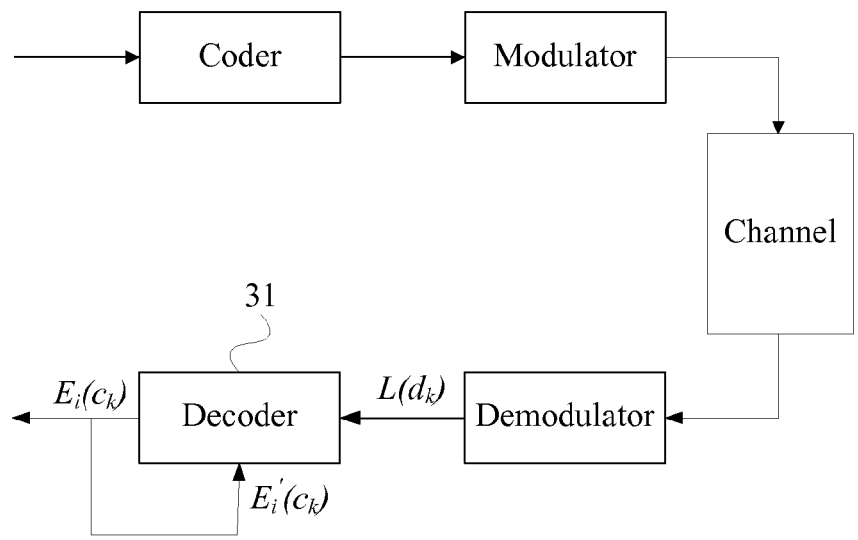
FIG. 2 is a schematic diagram of a system structure of a fiber optic communications system according to the present invention.

For example, in implementation scenarios in which the transmitter only performs M-ary differential coding processing on a to-be-sent signal, and correspondingly, decoding processing performed by the receiver on the demodulation signal is M-ary differential decoding processing, and the like, FIG. 2 is a schematic diagram of a system structure of a fiber optic communications system according to the present invention. As shown in FIG. 2, $E_i'(c_k)$ is the same as $E_i(c_k)$, that is, decoding is performed again by using an output signal of a decoder 31 and a modulation signal as input signals of the decoder 31. The foregoing steps are repeated until i is equal to N and N is greater than or equal to 2.

Figure 3:
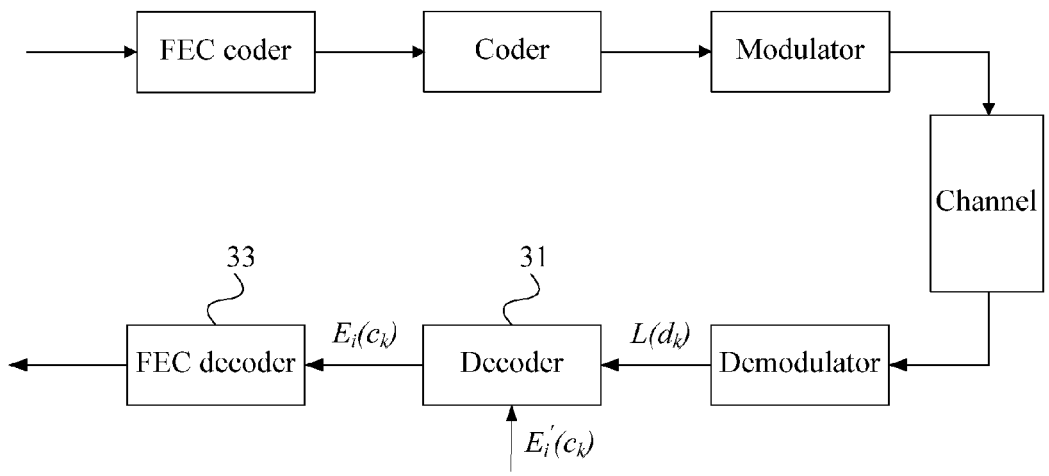
FIG. 3 is another schematic diagram of a system structure of a fiber optic communications system according to the present invention.

For example, in implementation scenarios in which the transmitter first performs FEC coding processing on a to-be-sent signal, and then performs M-ary differential coding processing on the to-be-sent signal, and correspondingly, the receiver first performs M-ary differential decoding processing on the demodulation signal, and then performs FEC decoding processing on the demodulation signal, and the like, FIG. 3 is another schematic diagram of a system structure of a fiber optic communications system according to the present invention. As shown in FIG. 3, $E_i(c_k)$ is an output signal of a decoder 31, that is, an input signal of an FEC decoder 33, and $E_i'(c_k)$ is an output signal of the FEC decoder 33, that is, decoding is performed again by using the output signal of the FEC decoder 33 and a modulation signal as input signals of the decoder 31. The foregoing steps are repeated until i is equal to N and N is greater than or equal to 2.

Figure 4:
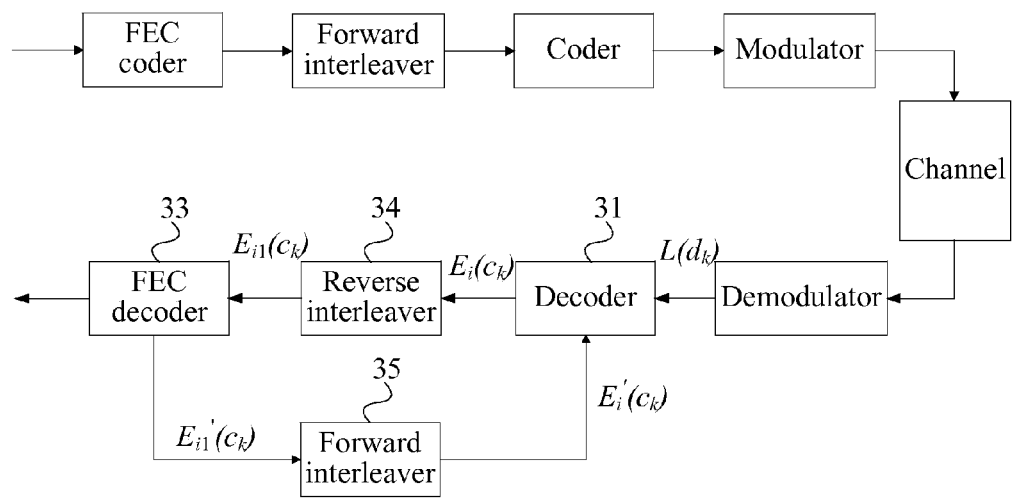
FIG. 4 is still another schematic diagram of a system structure of a fiber optic communications system according to the present invention.

For example, in implementation scenarios in which the transmitter first performs FEC coding processing on a to-be-sent signal, performs forward interleaving processing on the to-be-sent signal, and then performs M-ary differential coding processing on the to-be-sent signal, and correspondingly, the receiver first performs M-ary differential decoding processing on the demodulation signal, performs reverse interleaving processing on the demodulation signal, performs FEC decoding processing on the demodulation signal, and then performs forward interleaving processing on a signal after FEC decoding processing, and the like, FIG. 4 is still another schematic diagram of a system structure of a fiber optic communications system according to the present invention. As shown in FIG. 4, $E_i(c_k)$ is an output signal of a decoder 31, that is, an input signal of a reverse interleaver 34, $E_{i1}(c_k)$ is an output signal of the reverse interleaver 34, that is, an input signal of an FEC decoder 33, $E_{i1}'(c_k)$ is an output signal of the FEC decoder 33, that is, an input signal of a forward interleaver 35, and $E_i'(c_k)$ is an output signal of the forward interleaver 35, that is, an input signal of the decoder 31, that is, decoding is performed again by using the output signal of the forward interleaver 35 and a modulation signal as input signals of the decoder 31. The foregoing steps are repeated until i is equal to N and N is greater than or equal to 2.

A value of N in the foregoing systems is determined according to requirements on signal quality in an actual application. Generally, a larger value of N indicates a larger number of iterations and better quality of a signal output finally.

Compared with the prior art, in the foregoing optical fiber communications systems, the first decoding signal fed back after decoding processing is performed is added to the input signal of the decoder 31, and after iterative decoding is performed for multiple times, a bit error rate is lowered.

In this embodiment, a demodulation signal and a first decoding signal are acquired; and M-ary differential decoding processing is performed on the demodulation signal according to a first decoding signal fed back after M-ary decoding processing is performed on the demodulation signal, to obtain a second decoding signal. Because a decoder adds a decoding processing result as a feedback signal, bit error spread generated in a decoding process is reduced, a bit error rate of a system is lowered, and accuracy of signal transmission is improved.

Figure 6:
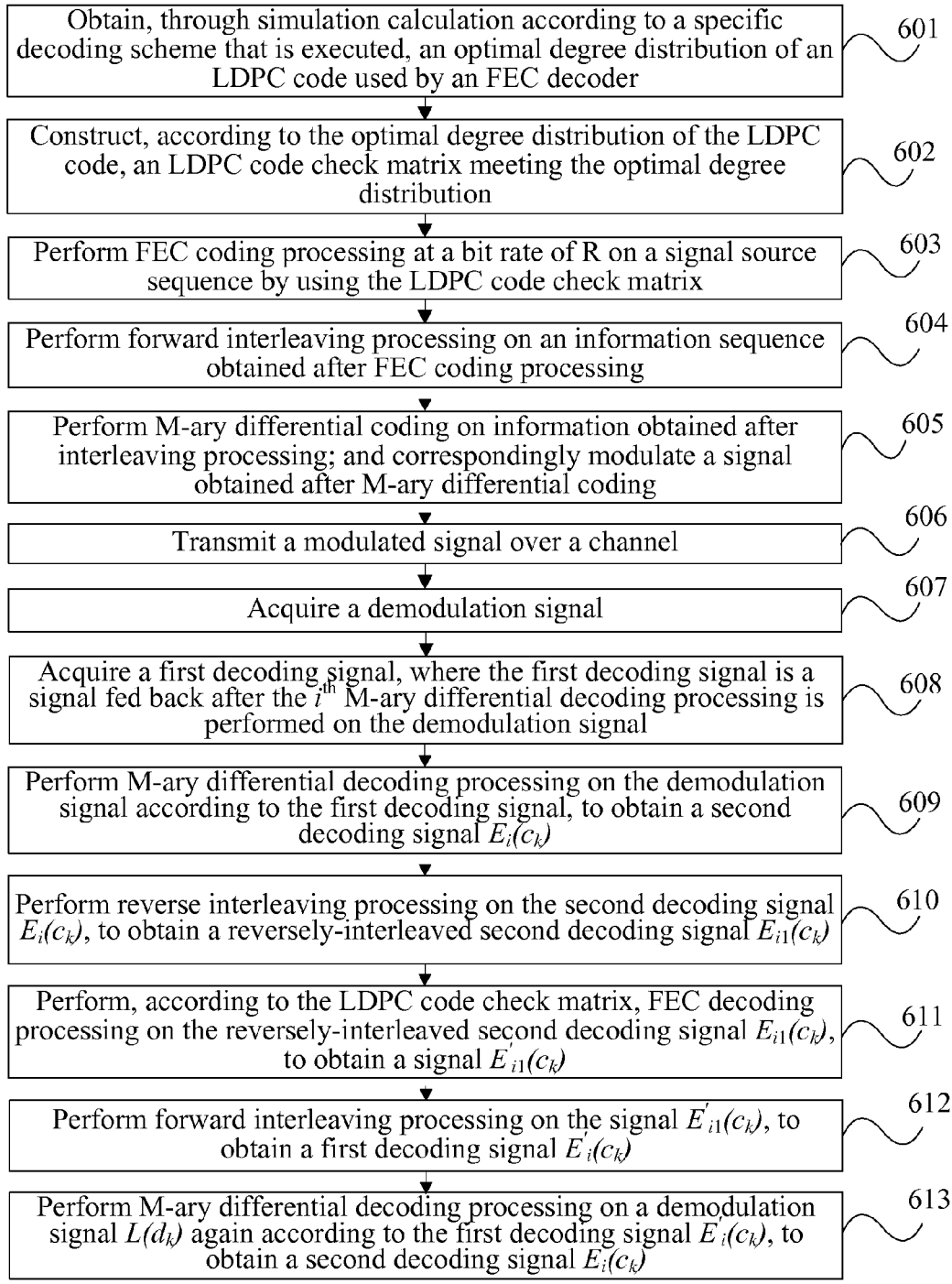
FIG. 6 is a schematic flowchart of Embodiment 2 of a decoding method according to the present invention.

FIG. 6 is a schematic flowchart of Embodiment 2 of a decoding method according to the present invention. As shown in FIG. 6, this embodiment provides entire processes in which a transmitter sends a signal and a receiver receives a signal. In this embodiment, the transmitter may successively perform FEC coding, forward interleaving processing, M-ary differential coding, and a modulation operation on a to-be-sent signal, and correspondingly, the receiver may successively perform demodulation, M-ary differential decoding, reverse interleaving processing, FEC decoding, and other operations on a received signal. The method includes the following steps.

In this embodiment, FEC coding may be performed by using multiple types of codes, for example, the transmitter may perform FEC coding on the to-be-sent signal by using a low density parity check (LDPC) code. Correspondingly, the receiver needs to perform FEC decoding on the received signal by using the LDPC code. Optionally, the transmitter may perform differential coding on the to-be-sent signal by using a differential quadrature phase shift keying (DQPSK) code or perform differential coding on the to-be-sent signal by using hexadecimal differential quadrature amplitude modulation 16 (D16QAM). Correspondingly, the receiver may perform, by using a BCJR algorithm, M-ary differential decoding on the received signal according to a corresponding state transition diagram during DQPSK or 16QAM coding.

It should be noted that, S601 and S602 in this embodiment are steps of obtaining an optimal degree distribution of the LDPC code used in FEC coding and decoding, and constructing an LDPC code check matrix. S603 to S605 are steps performed by the transmitter, S606 is a step in which the to-be-sent signal enters a channel for transmission after being processed by the transmitter, and S607 to S613 are steps performed by the receiver.

S601: Obtain, through simulation calculation according to a specific decoding scheme that is executed, an optimal degree distribution of an LDPC code used by an FEC decoder.

Specifically, an initial degree distribution at a set bit rate based on which the FEC decoding processing is performed may be first determined, for example, it is determined that an initial degree distribution at a set bit rate R is ($\lambda$, $\rho$), where $\lambda$ is a row weight and $\rho$ is a column weight, that is, the row weight represents a quantity of 1s in each row in the LDPC check matrix, and the column weight represents a quantity of is in each column in the LDPC check matrix.

It should be noted that, a Monte Carlo simulation method is used in this step.

Then, an initial signal-to-noise ratio corresponding to the initial degree distribution may be determined.

The initial signal-to-noise ratio is denoted as a signal to noise ratio (SNR), and an initial value of a counter may be set as follows: N=0, where N indicates an $N^{th}$ signal-to-noise ratio.

Multiple first degree distributions corresponding to the set bit rate are successively determined, and if two curves in an extrinsic information transition diagram of the first degree distributions corresponding to the set bit rate at the initial signal-to-noise ratio do not intersect, the initial signal-to-noise ratio is updated with a first signal-to-noise ratio corresponding to the first degree distribution, until a quantity of the determined first degree distributions meets a set value.

Specifically, other first degree distributions ($\lambda'$, $\rho'$) corresponding to the set bit rate R may be successively determined, and each time when one first degree distribution is determined, a value of N of the counter is increased by 1, that is, N=N+1. According to the initial signal-to-noise ratio SNR, if two curves in an extrinsic information transition diagram of the first degree distributions ($\lambda'$, $\rho'$) corresponding to the set bit rate R do not intersect, the initial signal-to-noise ratio SNR is updated with a first signal-to-noise ratio corresponding to the first degree distribution ($\lambda'$, $\rho'$), until the quantity N of the determined first degree distributions meets the set value.

The first degree distributions that are corresponding to the first signal-to-noise ratio and whose quantity meets the set value may be used as the optimal degree distribution of the LDPC code.

The optimal degree distribution is related to the specific decoding scheme that is executed, and therefore, optimal degree distributions, which are obtained by using different decoding schemes, of the LDPC code are different.

S602: Construct, according to the optimal degree distribution of the LDPC code, an LDPC code check matrix meeting the optimal degree distribution.

S603: Perform FEC coding processing at a bit rate of R on a signal source sequence by using the LDPC code check matrix.

For example, FEC coding at a bit rate of ⅚ is performed on a signal source sequence of a signal source length of 15000 by using the LDPC code check matrix, and an information sequence length after coding is 18000.

FEC coding at a bit rate of ¾ is performed on a signal source sequence of a signal source length of 3000 by using the LDPC code check matrix, and an information sequence length after coding is 4000.

S604: Perform forward interleaving processing on an information sequence after FEC coding processing.

In forward interleaving processing, an order of the information sequence after FEC coding processing may be disrupted by using a random interleaving sequence, so as to optimize information distribution.

S605: Perform M-ary differential coding on information after interleaving processing; and correspondingly modulate a signal after M-ary differential coding.

Optionally, the M-ary differential coding is DQPSK differential coding or D16QAM differential coding.

Figure 7A:
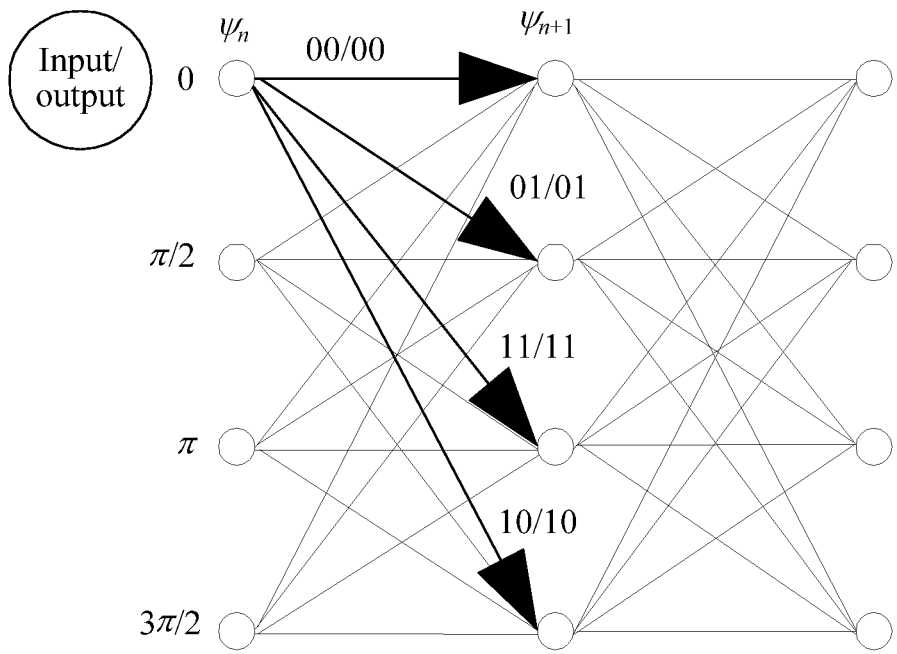
FIG. 7a is a state transition diagram of DQPSK differential coding in a decoding method according to the present invention.
Figure 7B:
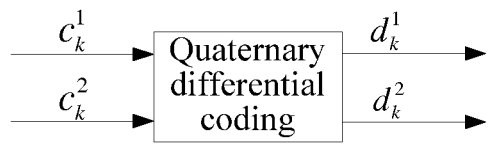
FIG. 7b is a block diagram of DQPSK differential coding in a decoding method according to the present invention.

As a feasible implementation manner, the M-ary differential coding is DQPSK differential coding. Specifically, information is transmitted by using a phase difference between a carrier phase of a current bit and a carrier phase of a previous bit, and DQPSK differential coding is also referred to as quaternary differential coding. FIG. 7a is a state transition diagram of DQPSK differential coding in a decoding method according to the present invention. As shown in FIG. 7a, in a DQPSK coding process, coding may be performed by using the state transition diagram shown in FIG. 7a. FIG. 7b is a block diagram of DQPSK differential coding in a decoding method according to the present invention. As shown in FIG. 7b, a DQPSK differential coding process may be expressed by using the following relations:

if $d_{k-1}^1 \oplus d_{k-1}^2 = 0$, $d_k^1 = c_k^1 \oplus d_{k-1}^1$ and $d_k^2 = c_k^2 \oplus d_{k-1}^2$; and if $d_{k-1}^1 \oplus d_{k-1}^2 = 1$, $d_k^1 = c_k^2 \oplus d_{k-1}^1$ and $d_k^2 = c_k^1 \oplus d_{k-1}^2$, where k indicates a moment, and a value range thereof is 0, 1, 2, . . . , N; $c_{k-1}^1$ and $c_{k-1}^2$ indicate two input values of differential coding at a moment (k−1); $c_k^1$ and $c_k^2$ indicates two input values of differential coding at the moment k; $d_{k-1}^1$ and $d_{k-1}^2$ indicates two output values of differential coding at the moment (k−1); $d_k^1$ and $d_k^2$ indicates two output values of differential coding at the moment k; and when coding is performed at the beginning, it is assumed that $d_{-1}=0$ and $d_{-1}=0$.

Figure 8:
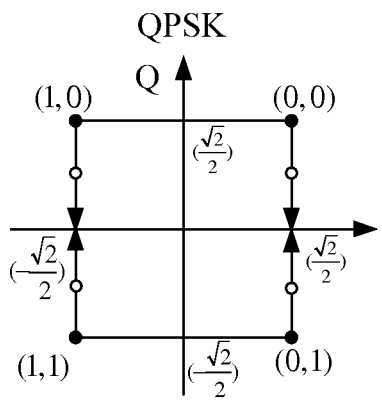
FIG. 8 is a modulation constellation diagram of QPSK in a decoding method according to the present invention.

When differential coding is performed by using DQPSK, correspondingly, a modulation scheme uses QPSK modulation. FIG. 8 is a modulation constellation diagram of QPSK in a decoding method according to the present invention. As shown in FIG. 8, the modulation constellation diagram is a Gray constellation diagram.

Figure 9:
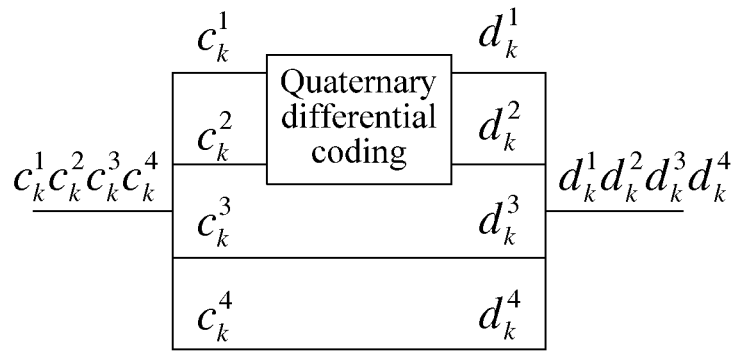
FIG. 9 is a schematic diagram of 16QAM coding in a decoding method according to the present invention.

As another feasible implementation manner, M-ary differential coding is D16QAM differential coding. FIG. 9 is a schematic diagram of D16QAM coding in a decoding method according to the present invention. As shown in FIG. 9, for four input bits, which are $c_k^1 c_k^2 c_k^3 c_k^4$, quaternary differential coding is only performed on the first two bits, which are $c_k^1 c_k^2$, by using a state transition diagram and using a quaternary differential coder, and the last two bits $c_k^3 c_k^4$ remains unchanged. Same symbols in FIG. 9 and in FIG. 8 have same meanings, and details are not provided herein again.

Figure 10:
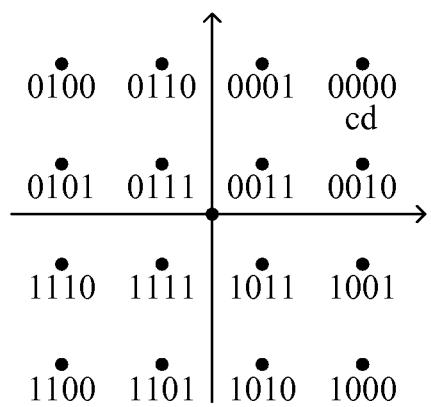
FIG. 10 is a modulation constellation diagram of 16QAM in a decoding method according to the present invention.

When D16QAM system differential coding is used, correspondingly, a modulation scheme uses a 16QAM modulation scheme for modulation. FIG. 10 is a modulation constellation diagram of 16QAM in a decoding method according to the present invention. As shown in FIG. 10, the modulation constellation diagram in the 16QAM modulation scheme is a rotation constellation diagram. In the modulation constellation diagram shown in FIG. 10, the first two bits specify a quadrant in which a signal is located, and the last two bits specify a configuration of a signal vector in each quadrant, and present a π/2 rotation feature. In order to lower a bit error rate, Grey mapping is performed on the last two bits in each quadrant.

S606: A modulated signal enters a channel for transmission.

Because noise exists on the channel, an error bit may be generated in a process of transmitting the signal on the channel.

S607: Acquire a demodulation signal.

Specifically, the signal transmitted on the channel is received, and is demodulated by using a demodulation scheme corresponding to the modulation scheme, to obtain a demodulation signal $L(d_k)$.

S608: Acquire a first decoding signal, where the first decoding signal is a signal fed back after the $i^{th}$ M-ary differential decoding processing is performed on the demodulation signal.

This step is similar to S502 in the embodiment shown in FIG. 5, and is not described in detail herein again.

S609: Perform M-ary differential decoding processing on the demodulation signal according to the first decoding signal, to obtain a second decoding signal $E_i(c_k)$.

Differential decoding processing may be decoding processing that is corresponding to coding processing performed by the transmitter and that is performed by the receiver on the demodulation signal.

For example, in a feasible implementation manner, when the transmitter uses DQPSK differential coding, correspondingly, the receiver performs, by using a Bahl-Cocke-Jelinek-Raviv (BCJR) algorithm, M-ary differential decoding processing on the demodulation signal according to a state transition diagram of the DQPSK differential coding corresponding to the demodulation signal, to obtain a second decoding signal $E_i(c_k)$ according to $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using the BCJR) algorithm, $E_i'(c_k)$ is the first decoding signal, and $E_i(c_k)$ is the second decoding signal. A specific process is described in detail below.

In another feasible implementation manner, when the transmitter uses D16QAM differential coding, correspondingly, the receiver performs, by using a BCJR algorithm, M-ary differential decoding processing according to a state transition diagram of the 16QAM differential coding corresponding to the demodulation signal, to obtain a second decoding signal $E_i(c_k)$ according to $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using the BCJR algorithm, $E_i'(c_k)$ is the first decoding signal, and $E_i(c_k)$ is the second decoding signal. A specific process is described in detail below.

Specifically, differential coding inputs in step S608 are $E_i'(c_k)$ and $L(d_k)$, and an output is $E_i(c_k)$, where $c_k$ indicates a differential coding input bit at the moment k, $d_k$ indicates a differential coding output bit at the moment k, $L(d_k)$ is a demodulation signal after demodulation processing, $E_i'(c_k)$ is the first decoding signal fed back after M-ary decoding processing is performed on the demodulation signal, the first decoding signal is set to 0 in the first iteration, and $E_i(c_k)$ is a second decoding signal of the bit sequence $c_k$ output by a differential decoding module.

The following several measurements need to be used in the BCJR algorithm: a forward probability $\alpha_{k-1}(s')=P(S_{k-1}=s', y_{j<k})$, indicating a probability that a receiving sequence is $y_{j<k}$ and a state at the moment (k−1) is s'; a backward probability $\beta_k(s)=P(y_{j>k}|S_k=s)$, indicating a probability that a state at the moment k is s and then a receiving sequence is $y_{j>k}$; and a state transition probability $\gamma_k(s', s)=P(S_k=s, y_k|S_{k-1}=s')$, indicating a state transition probability that the given state s' is transited to s and a receiving code word is $y_k$, where $S_k$ indicates a state of the state transition diagram at the moment k, $S_{k-1}$ indicates a state of the state transition diagram at the moment (k−1), $y_{j<k}$ indicates receiving code word sequences from a moment 0 to the moment (k−1), and $y_{j>k}$ indicates receiving code word sequences from a moment (k+1) to a moment N.

A differential decoding algorithm based on the forward, backward, and transition probabilities includes the following steps.

A first step: Initialize α and β, and initialize a forward probability of each state at the moment 0 and a backward probability of each state at the moment N.

There are two methods for initializing α:
(1) if an initial state is 0:

$$\begin{cases} \alpha_0(0) = 0 \\ \alpha_0(s) = -\infty, \forall s \neq 0 \end{cases};$$

(2) if the probabilities of the states are equal during decoding:

$$\alpha_0(s) = \lg 1/4.$$

β is initialized as follows:

$$\beta_N(s) = \lg 1/4.$$

A second step: Calculate a transition probability γ, and a formula is shown as follows:

$$\gamma_k(s',s) = P(c_k)P(Y_k/d_k),$$

where $Y_k$ indicates symbol information received from a channel at the moment k, and a relationship between a demodulation signal $L(d_k)$ and $Y_k$ is shown by the following formula:

$$L(d_k) = \frac{P(Y_k/d_k = 0)}{P(Y_k/d_k = 1)}.$$

A third step: Calculate a forward probability $\alpha_k(s)$ according to γ and $\alpha_0(s)$, and a formula is shown as follows:

$$\alpha_k(s) = \sum_{s'} \alpha_{k-1}(s')\gamma_k(s',s).$$

An operation E is defined as follows:

$$aEb = \ln(e^a + e^b) = \max(a,b) + \ln(1 + e^{-|a-b|}).$$

A calculation formula of the forward probability may be further expressed as follows:

$$\alpha_k(s) = E_{s'}(\alpha_{k-1}(s') + \gamma_k(s',s)).$$

A fourth step: Calculate a backward probability $\beta_{k-1}(s')$ according to γ and $\beta_N(s)$, and a formula is shown as follows:

$$\beta_{k-1}(s') = \sum_s \beta_k(s)\gamma_k(s',s).$$

The backward probability may be further expressed as follows by using the operation E:

$$\beta_{k-1}(s') = E_{s'}(\beta_k(s) + \gamma_k(s',s)).$$

A fifth step: Calculate values of a posterior probability and the second decoding signal.

A calculation formula of the posterior probability (that is, a likelihood ratio) is as follows:

$$L(c_k/\vec{Y_N}) = \underset{\substack{s',s \\ c_k=1}}{E}(\alpha_{k-1}(s') + \gamma_k(s',s) + \beta_k(s)) - \underset{\substack{s',s \\ c_k=-1}}{E}(\alpha_{k-1}(s') + \gamma_k(s',s) + \beta_k(s)).$$

A value of the second decoding signal output by using a coding bit is:

$$E_i(c_k) = L(c_k/\vec{Y_N}) - E_i'(c_k),$$

where $\vec{Y_N}$ indicates the symbol information sequence corresponding to the demodulation signal before being demodulated.

The first decoding signal is a signal fed back by a receiver after forward interleaving processing is performed, and an initial value of the first decoding signal is 0. Different from the prior art, the performing M-ary differential decoding processing on the demodulation signal according to the first decoding signal, to obtain a second decoding signal in this step is that after the receiver performs decoding processing on the demodulation signal, the receiver may use a result obtained by performing decoding processing previously, that is, the first decoding signal, and a modulation signal as input signals for performing current decoding processing. A decoding process of the receiver may be regarded as an iterative decoding process.

S610: Perform reverse interleaving processing on the second decoding signal $E_i(c_k)$, to obtain a second decoding signal $E_{i1}(c_k)$ after reverse interleaving processing.

Specifically, an interleaving sequence used for performing reverse interleaving processing by the receiver is identical with that used for performing forward interleaving processing by the transmitter, and forward interleaving processing is performed on the second decoding signal, to optimize information distribution.

S611: Perform, according to the LDPC code check matrix, FEC decoding processing on the second decoding signal $E_{i1}(c_k)$ after reverse interleaving processing, to obtain a signal $E_{i1}'(c_k)$.

For example, a signal output for the first time after FEC decoding processing is $E_{11}'(c_k)$, a signal output for the second time is $E_{21}'(c_k)$, a signal output for the third time is $E_{31}'(c_k)$, and by analogy, a signal output for the $N^{th}$ time is $E_{N1}'(c_k)$, where N is as preset number of iterations. A bit error rate of a signal $E_{(i+1)1}'(c_k)$ is less than a bit error rate of the signal $E_{i1}'(c_k)$, and a bit error rate of a signal output for the $(i+1)^{th}$ time after FEC decoding processing is less than a bit error rate of a signal output for the $i^{th}$ time.

S612: Perform forward interleaving processing on the signal $E_{i1}'(c_k)$, to obtain a first decoding signal $E_i'(c_k)$.

An interleaving sequence used for performing forward interleaving processing by the receiver is identical with that used for performing forward interleaving processing by the transmitter, and is used for optimizing the signal $E_{i1}'(c_k)$, to obtain the first decoding signal $E_i'(c_k)$.

S613: Perform M-ary differential decoding processing on a demodulation signal $L(d_k)$ again according to the first decoding signal $E_i'(c_k)$, to obtain the second decoding signal $E_i(c_k)$.

For example, a signal output for the first time after M-ary differential decoding is a second decoding signal $E_1(c_k)$, a signal output for the second time is a second decoding signal $E_2(c_k)$, a signal output for the third time is a second decoding signal $E_3(c_k)$, and by analogy, a signal output for the $N^{th}$ time is a second decoding signal $E_N(c_k)$, where N is a preset number of iterations. A bit error rate of $E_{(i+1)}(c_k)$ is less than a bit error rate of a signal $E_i(c_k)$, that is, a signal output by an M-ary differential decoder for the $(i+1)^{th}$ time is less than a bit error rate of a signal output for the $i^{th}$ time.

S608 to S613 are repeated until i is equal to N, and a signal after FEC decoding processing is output.

Optionally, after i is equal to N, a signal output by the FEC decoder may be further determined, so as to obtain quality of the output signal.

In this embodiment, a demodulation signal is acquired; and decoding processing is performed on the demodulation signal according to a first decoding signal fed back after M-ary decoding processing is performed on the demodulation signal, to obtain a second decoding signal. Because a decoder adds a decoding processing result as a feedback signal, bit error spread generated in a decoding process is reduced, a bit error rate of a system is lowered, and accuracy of signal transmission is improved. It is shown by using an simulation result that, according to the technical solution in this embodiment, a DQPSK coding and decoding system effectively compensates a bit error rate of 2 dB, and a D16QAM coding and decoding system effectively compensates a bit error rate of 2.3 dB. By optimizing an LDPC code of an FEC decoder in a differential iterative decoding system, performance of a DQPSK differential iteration system approaches performance of a regular LDPC code in a non-differential system, and performance of a D16QAM differential iteration system exceeds performance of a regular LDPC code in a non-differential system, which solves the problem of bit error spread to a great extent, and lowers a bit error rate of a system.

The foregoing embodiment is an exemplary implementation manner using the optical fiber communications system shown in FIG. 4 as an example. An implementation principle and technical effects of the optical fiber communications system shown in FIG. 2 are similar to an implementation principle and technical effects of the optical fiber communications system shown in FIG. 3, and details are not provided herein again.

Figure 11:
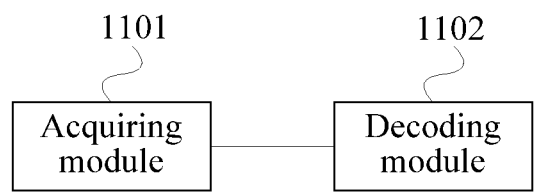
FIG. 11 is a schematic structural diagram of Embodiment 1 of a decoding apparatus according to the present invention.

FIG. 11 is a schematic structural diagram of Embodiment 1 of a decoding apparatus according to the present invention. As shown in FIG. 11, the structure of this embodiment includes: an acquiring module 1101 and a decoding module 1102. The acquiring module 1101 is configured to acquire a demodulation signal. The decoding module 1102 is configured to acquire a first decoding signal, where the first decoding signal is a signal fed back after the $i^{th}$ M-ary differential decoding processing is performed on the demodulation signal, and i is an integer greater than or equal to 0. The decoding module 1102 is further configured to perform M-ary differential decoding processing on the demodulation signal according to the first decoding signal, to obtain a second decoding signal.

The apparatuses in this embodiment may be configured to execute the technical solution of the method embodiment shown in FIG. 5, and implementation principles and technical effects thereof are similar, and details are not provided herein again.

Further, the decoding module 1102 is specifically configured to perform, by using a Bahl-Cocke-Jelinek-Raviv BCJR algorithm, M-ary differential decoding processing on the demodulation signal according to a state transition diagram of differential quadrature phase shift keying DQPSK differential coding or hexadecimal quadrature amplitude modulation D16QAM differential coding corresponding to the demodulation signal; and obtain the second decoding signal according to $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using the BCJR algorithm, $E_i'(c_k)$ is the first decoding signal, and $E_i(c_k)$ is the second decoding signal.

Figure 12:
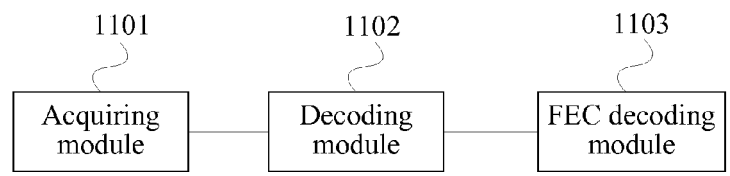
FIG. 12 is a schematic structural diagram of Embodiment 2 of a decoding apparatus according to the present invention.

FIG. 12 is a schematic structural diagram of Embodiment 2 of a decoding apparatus according to the present invention. Based on the embodiment shown in FIG. 11, in FIG. 12, further, an FEC decoding module 1103 is further included. The FEC decoding module 1103 is configured to perform forward error correction FEC decoding processing on the second decoding signal obtained after M-ary differential decoding processing is performed.

Further, the FEC decoding module 1103 is specifically configured to optimize a degree distribution of a low-density parity-check LDPC code used for FEC coding corresponding to the second decoding signal, to acquire an optimal degree distribution of the LDPC code; construct, according to the optimal degree distribution, an LDPC code check matrix meeting the optimal degree distribution; and perform, according to the LDPC code check matrix, FEC decoding processing on the second decoding signal obtained after M-ary differential decoding processing is performed.

Further, the FEC decoding module 1103 is specifically configured to determine an initial degree distribution at a set bit rate based on which FEC decoding processing is performed; determine an initial signal-to-noise ratio corresponding to the initial degree distribution; and successively determine multiple first degree distributions corresponding to the set bit rate, and if two curves in an extrinsic information transition diagram of the first degree distributions corresponding to the set bit rate at the initial signal-to-noise ratio do not intersect, update the initial signal-to-noise ratio with a first signal-to-noise ratio corresponding to the first degree distribution, until a quantity of the determined first degree distributions meets a set value; and use the first degree distributions that are corresponding to the first signal-to-noise ratio and whose quantity meets the set value as the optimal degree distribution of the LDPC code.

The apparatuses in this embodiment may be configured to execute the technical solution of the method embodiment shown in FIG. 6, and implementation principles and technical effects thereof are similar, and details are not provided herein again.

Figure 13:
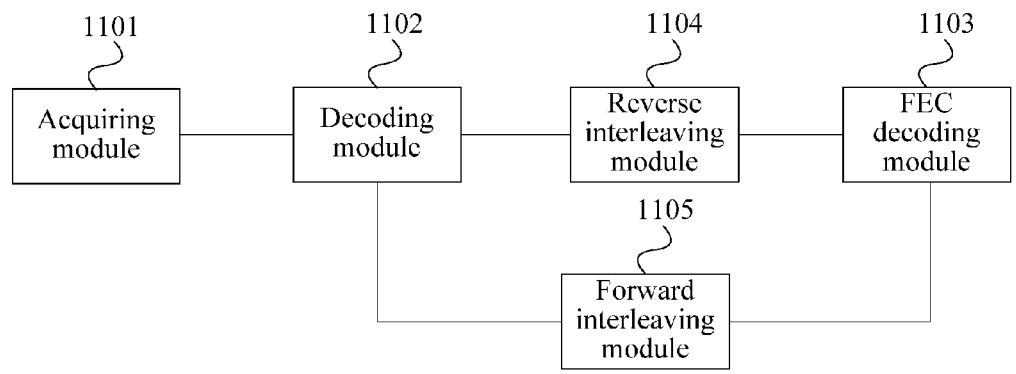
FIG. 13 is a schematic structural diagram of Embodiment 3 of a decoding apparatus according to the present invention.

FIG. 13 is a schematic structural diagram of Embodiment 3 of a decoding apparatus according to the present invention. As shown in FIG. 13, based on the embodiment shown in FIG. 12, in FIG. 13, further, a reverse interleaving module 1104 and a forward interleaving module 1105 are further included. The reverse interleaving module 1104 is configured to perform reverse interleaving processing on the second decoding signal obtained after M-ary differential decoding processing is performed, to obtain a reversely-interleaved second decoding signal. The FEC decoding module 1103 is specifically configured to perform FEC decoding processing on the reversely-interleaved second decoding signal. The forward interleaving module 1105 is configured to perform forward interleaving processing on the first decoding signal.

The apparatuses in this embodiment may be configured to execute the technical solution of the method embodiment shown in FIG. 6, and implementation principles and technical effects thereof are similar, and details are not provided herein again.

Figure 14:
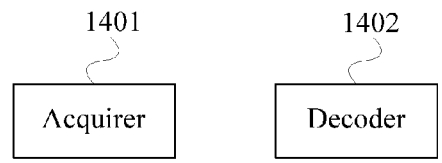
FIG. 14 is a schematic structural diagram of Embodiment 4 of a decoding apparatus according to the present invention.

FIG. 14 is a schematic structural diagram of Embodiment 4 of a decoding apparatus according to the present invention. As shown in FIG. 14, the apparatus in this embodiment includes an acquirer 1401 and a decoder 1402. The acquirer 1401 is configured to acquire a demodulation signal. The decoder 1402 is configured to acquire a first decoding signal, where the first decoding signal is a signal fed back after the $i^{th}$ M-ary differential decoding processing is performed on the demodulation signal, and i is an integer greater than or equal to 0. The decoder 1402 is further configured to perform M-ary differential decoding processing on the demodulation signal according to the first decoding signal, to obtain a second decoding signal.

The apparatuses in this embodiment may be configured to execute the technical solution of the method embodiment shown in FIG. 5, and implementation principles and technical effects thereof are similar, and details are not provided herein again.

Further, the decoder 1402 is specifically configured to perform, by using a Bahl-Cocke-Jelinek-Raviv BCJR algorithm, M-ary differential decoding processing on the demodulation signal according to a state transition diagram of differential quadrature phase shift keying DQPSK differential coding or hexadecimal quadrature amplitude modulation D16QAM differential coding corresponding to the demodulation signal; and obtain the second decoding signal according to $E_i(c_k)=L(c_k/\vec{Y}_N)-E_i'(c_k)$, where $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using the BCJR algorithm, $E_i'(c_k)$ is the first decoding signal, and $E_i(c_k)$ is the second decoding signal.

Figure 15:
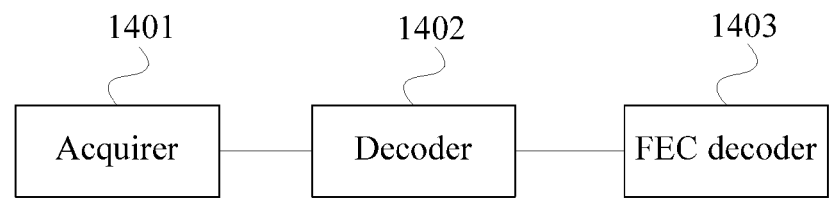
FIG. 15 is a schematic structural diagram of Embodiment 5 of a decoding apparatus according to the present invention.

FIG. 15 is a schematic structural diagram of Embodiment 5 of a decoding apparatus according to the present invention. Based on the embodiment shown in FIG. 14, in FIG. 15, further, an FEC decoder 1403 is further included. The FEC decoder 1403 is configured to perform forward error correction FEC decoding processing on the second decoding signal obtained after M-ary differential decoding processing is performed.

Further, the FEC decoder 1403 is specifically configured to optimize a degree distribution of a low-density parity-check LDPC code used for FEC coding corresponding to the second decoding signal, to acquire an optimal degree distribution of the LDPC code; construct, according to the optimal degree distribution, an LDPC code check matrix meeting the optimal degree distribution; and perform, according to the LDPC code check matrix, FEC decoding processing on the second decoding signal obtained after M-ary differential decoding processing is performed.

Further, the FEC decoder 1403 is specifically configured to determine an initial degree distribution at a set bit rate based on which the FEC decoding processing is performed; determine an initial signal-to-noise ratio corresponding to the initial degree distribution; and successively determine multiple first degree distributions corresponding to the set bit rate, and if two curves in an extrinsic information transition diagram of the first degree distributions corresponding to the set bit rate at the initial signal-to-noise ratio do not intersect, update the initial signal-to-noise ratio with a first signal-to-noise ratio corresponding to the first degree distribution, until a quantity of the determined first degree distributions meets a set value; and use the first degree distributions that are corresponding to the first signal-to-noise ratio and whose quantity meets the set value as the optimal degree distribution of the LDPC code.

The apparatuses in this embodiment may be configured to execute the technical solution of the method embodiment shown in FIG. 6, and implementation principles and technical effects thereof are similar, and details are not provided herein again.

Figure 16:
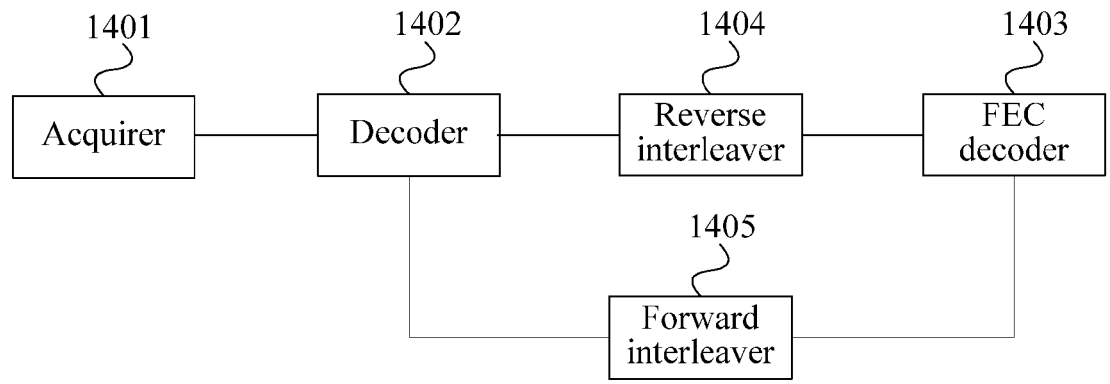
FIG. 16 is a schematic structural diagram of Embodiment 6 of a decoding apparatus according to the present invention.

FIG. 16 is a schematic structural diagram of Embodiment 6 of a decoding apparatus according to the present invention. Based on the embodiment shown in FIG. 15, in FIG. 16, further, a reverse interleaver 1404 and a forward interleaver 1405 are further included. The reverse interleaver 1404 is configured to perform reverse interleaving processing on the second decoding signal obtained after M-ary differential decoding processing is performed, to obtain a reversely-interleaved second decoding signal. The FEC decoder 1403 is specifically configured to perform FEC decoding processing on the reversely-interleaved second decoding signal. The forward interleaver 1405 is configured to perform forward interleaving processing on the first decoding signal.

The apparatuses in this embodiment may be configured to execute the technical solution of the method embodiment shown in FIG. 6, and implementation principles and technical effects thereof are similar, and details are not provided herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:
1. A decoding method, comprising:
  acquiring a demodulation signal;
  acquiring a first decoding signal, wherein the first decoding signal is a signal fed back after an $i^{th}$ M-ary differential decoding processing is performed on the demodulation signal, where i is an integer greater than or equal to 1; and performing M-ary differential decoding processing on the demodulation signal according to the first decoding signal, to obtain a second decoding signal, wherein the second decoding signal is obtained by determining a difference between a signal obtained after M-ary differential decoding processing is performed on the demodulation signal and the first decoding signal;

wherein the performing M-ary differential decoding processing on the demodulation signal according to the first decoding signal comprises:

performing, using a Bahl-Cocke-Jelinek-Raviv (BCJR) algorithm, M-ary differential decoding processing on the demodulation signal according to a state transition diagram of differential quadrature phase shift keying (DQPSK) differential coding or hexadecimal quadrature amplitude modulation (D16QAM) differential coding corresponding to the demodulation signal; and obtaining the second decoding signal according to the relation $E_i(c_k)=L(c_k/\vec{Y}_N)-E_i'(c_k)$, wherein $c_k$ indicates a bit sequence, $\vec{Y}_N$ indicates a symbol information sequence corresponding to the demodulation signal before being demodulated, $L(c_k/\vec{Y}_N)$ is the signal obtained after M-ary differential decoding processing is performed on the demodulation signal by using the BCJR algorithm, $E_i'(c_k)$ is the first decoding signal, and $E_i(c_k)$ is the second decoding signal.

2. The method according to claim 1, further comprising:
performing forward error correction (FEC) decoding processing on the second decoding signal.

3. The method according to claim 2, wherein the performing FEC decoding processing on the second decoding signal comprises:

optimizing a degree distribution of a low-density parity-check (LDPC) code used for FEC coding corresponding to the second decoding signal, to acquire an optimal degree distribution of the LDPC code;

constructing, according to the optimal degree distribution, an LDPC code check matrix meeting the optimal degree distribution; and performing, according to the LDPC code check matrix, FEC decoding processing on the second decoding signal obtained after M-ary differential decoding processing is performed.

4. The method according to claim 3, wherein optimizing the degree distribution of the LDPC code comprises:

determining an initial degree distribution at a set bit rate based on a bit rate at which the FEC decoding processing is performed;

determining an initial signal-to-noise ratio corresponding to the initial degree distribution;

successively determining a plurality of first degree distributions corresponding to the set bit rate, and if two curves in an extrinsic information transition diagram of one of the plurality of first degree distributions corresponding to the set bit rate at the initial signal-to-noise ratio do not intersect, updating the initial signal-to-noise ratio with a first signal-to-noise ratio corresponding to the one of the plurality of first degree distributions, until a quantity of the determined first degree distributions meets a set value; and using the first degree distributions that correspond to the first signal-to-noise ratio and whose quantity meets the set value as the optimal degree distribution of the LDPC code.

5. The method according to claim 2, further comprising:
performing reverse interleaving processing on the second decoding signal to obtain a reversely-interleaved second decoding signal; and performing forward interleaving processing on the first decoding signal;

wherein the performing forward error correction (FEC) decoding processing on the second decoding signal comprises performing FEC decoding processing on the reversely-interleaved second decoding signal.

6. A decoding apparatus, comprising:
a processor; and a computer-readable storage medium storing a program to be executed by the processor, the program including instructions for:

acquiring a demodulation signal; and acquiring a first decoding signal, wherein the first decoding signal is a signal fed back after an $i^{th}$ M-ary differential decoding processing is performed on the demodulation signal, where i is an integer greater than or equal to 1;

performing M-ary differential decoding processing on the demodulation signal according to the first decoding signal to obtain a second decoding signal, wherein the second decoding signal is obtained according to a comparison of a signal obtained after M-ary differential decoding processing is performed on the demodulation signal and the first decoding signal;

performing forward error correction (FEC) decoding processing on the second decoding signal, the performing FEC decoding processing on the second decoding signal comprising:

optimizing a degree distribution of a low-density parity-check (LDPC) code used for FEC coding corresponding to the second decoding signal, to acquire an optimal degree distribution of the LDPC code;

constructing, according to the optimal degree distribution, an LDPC code check matrix meeting the optimal degree distribution; and performing, according to the LDPC code check matrix, FEC decoding processing on the second decoding signal.

7. The apparatus according to claim 6, wherein the program further includes instructions for:

performing, by using a Bahl-Cocke-Jelinek-Raviv (BCJR) algorithm, M-ary differential decoding processing on the demodulation signal according to a state transition diagram of differential quadrature phase shift keying (DQPSK) differential coding or hexadecimal quadrature amplitude modulation (D16QAM) differential coding corresponding to the demodulation signal; and obtaining the second decoding signal according to the relation $E_i(c_k)=L(c_k/\vec{Y}_N)-E_i'(c_k)$, wherein $c_k$ indicates a bit sequence, $\vec{Y}_N$ indicates a symbol information sequence corresponding to the demodulation signal before being demodulated, $L(c_k/\vec{Y}_N)$ is the signal obtained after M-ary differential decoding processing is performed on the demodulation signal by using the BCJR algorithm, $E_i'(c_k)$ is the first decoding signal, and $E_i(c_k)$ is the second decoding signal.

8. The apparatus according to claim 6, wherein the program further includes instructions for:
   determining an initial degree distribution at a set bit rate based on a bit rate which the FEC decoding processing is performed;
   determining an initial signal-to-noise ratio corresponding to the initial degree distribution;
   successively determining a plurality of first degree distributions corresponding to the set bit rate, and if two curves in an extrinsic information transition diagram of one of the first degree distributions corresponding to the set bit rate at the initial signal-to-noise ratio do not intersect, update the initial signal-to-noise ratio with a first signal-to-noise ratio corresponding to the one of the plurality of first degree distributions, until a quantity of the determined first degree distributions meets a set value; and
   using the determined first degree distributions that correspond to the first signal-to-noise ratio and whose quantity meets the set value as the optimal degree distribution of the LDPC code.

9. The apparatus according to claim 6, wherein the program further includes instructions for:
   performing reverse interleaving processing on the second decoding signal to obtain a reversely-interleaved second decoding signal, wherein performing FEC decoding processing on the second decoding signal comprises performing FEC decoding processing on the reversely-interleaved second decoding signal; and
   performing forward interleaving processing on the first decoding signal.

10. A decoding apparatus, comprising:
    an acquirer, configured to acquire a demodulation signal; and
    a decoder, configured to acquire a first decoding signal, wherein the first decoding signal is a signal fed back after an $i^{th}$ M-ary differential decoding processing is performed on the demodulation signal, where i is an integer greater than or equal to 1, and wherein the decoder is further configured to perform M-ary differential decoding processing on the demodulation signal according to the first decoding signal, to obtain a second decoding signal, wherein the second decoding signal is obtained according to the relation $E_i(c_k)=L(c_k/\vec{Y}_N)-E_i'(c_k)$, wherein $c_k$ indicates a bit sequence, $\vec{Y}_N$ indicates a symbol information sequence corresponding to the demodulation signal before being demodulated, $L(c_k/\vec{Y}_N)$ is a signal obtained after M-ary differential decoding processing is performed on the demodulation signal by using a Bahl-Cocke-Jelinek-Raviv (BCJR) R algorithm, $E_i'(c_k)$ is the first decoding signal, and $E_i(c_k)$ is the second decoding signal;
    wherein the decoder is further configured to perform, by using the Bahl-Cocke-Jelinek-Raviv (BCJR) algorithm, M-ary differential decoding processing on the demodulation signal according to a state transition diagram of differential quadrature phase shift keying (DQPSK) differential coding or hexadecimal quadrature amplitude modulation (D16QAM) differential coding corresponding to the demodulation signal.

11. The apparatus according to claim 10, further comprising:
    an FEC decoder, configured to perform forward error correction decoding processing on the second decoding signal.

12. The apparatus according to claim 11, wherein the FEC decoder is further configured to optimize a degree distribution of a low-density parity-check LDPC code used for FEC coding corresponding to the second decoding signal, to acquire an optimal degree distribution of the LDPC code; construct, according to the optimal degree distribution, an LDPC code check matrix meeting the optimal degree distribution; and perform, according to the LDPC code check matrix, FEC decoding processing on the second decoding signal.

13. The apparatus according to claim 12, wherein the FEC decoder is further configured to:
    determine an initial degree distribution at a set bit rate based on a bit rate at which the FEC decoding processing is performed;
    determine an initial signal-to-noise ratio corresponding to the initial degree distribution; and
    successively determine a plurality of first degree distributions corresponding to the set bit rate, and if two curves in an extrinsic information transition diagram of one of the first degree distributions corresponding to the set bit rate at the initial signal-to-noise ratio do not intersect, update the initial signal-to-noise ratio with a first signal-to-noise ratio corresponding to the one of the first degree distributions, until a quantity of the determined first degree distributions meets a set value; and
    use the determined first degree distributions that correspond to the first signal-to-noise ratio and whose quantity meets the set value as the optimal degree distribution of the LDPC code.

14. The apparatus according to claim 11, further comprising:
    a reverse interleaver, configured to perform reverse interleaving processing on the second decoding signal to obtain a reversely-interleaved second decoding signal, wherein the FEC decoder is further configured to perform FEC decoding processing on the reversely-interleaved second decoding signal; and
    a forward interleaver, configured to perform forward interleaving processing on the first decoding signal.

* * * * *